(12) United States Patent
Bakri et al.

(10) Patent No.: US 11,660,798 B2
(45) Date of Patent: May 30, 2023

(54) ANNULAR MANIFOLD FOR AN EXTRUSION HEAD FOR PRODUCING A TUBULAR MOULDING FROM A THERMOPLASTIC MATERIAL

(71) Applicant: W. Müller GmbH, Troisdorf (DE)

(72) Inventors: Farid Bakri, Neunkirchen-Seelscheid (DE); Ulrich Walter, Lohmar (DE)

(73) Assignee: W. Müller GmbH, Troisdorf (DE)

( * ) Notice: Subject to any disclaimer, the term of this patent is extended or adjusted under 35 U.S.C. 154(b) by 290 days.

(21) Appl. No.: 16/867,824

(22) Filed: May 6, 2020

(65) Prior Publication Data

US 2020/0262123 A1 Aug. 20, 2020

Related U.S. Application Data

(63) Continuation of application No. PCT/EP2018/080203, filed on Nov. 5, 2018.

(30) Foreign Application Priority Data

Nov. 7, 2017 (EP) ..................................... 17200278

(51) Int. Cl.
  *B29C 48/325* (2019.01)
  *B29C 48/09* (2019.01)
  (Continued)

(52) U.S. Cl.
  CPC ............ *B29C 48/325* (2019.02); *B29C 48/09* (2019.02); *B29C 48/302* (2019.02); *B29C 48/34* (2019.02);
  (Continued)

(58) Field of Classification Search
None
See application file for complete search history.

(56) References Cited

U.S. PATENT DOCUMENTS

| | | | |
|---|---|---|---|
| 3,270,371 | A | 9/1966 | Schiedrum et al. |
| 4,182,603 | A | 1/1980 | Knittel |

(Continued)

FOREIGN PATENT DOCUMENTS

| | | |
|---|---|---|
| CN | 86103618 | 11/1986 |
| CN | 1108172 | 9/1995 |

(Continued)

OTHER PUBLICATIONS

International Search Report for international application PCT/EP2018/080203, dated Jan. 23, 2019.

*Primary Examiner* — Robert J Grun
(74) *Attorney, Agent, or Firm* — Burris Law, PLLC

(57) ABSTRACT

Annular manifold for an extrusion parison head for manufacturing a tubular moulding from a thermoplastic material includes an accommodation body with a first accommodation chamber with an inner surface, a first distribution sleeve with an outer surface, which has a distribution groove, wherein the first distribution sleeve is accommodated in the first accommodation chamber, as well as an annular first distribution chamber, which is formed between the inner surface of the first accommodation chamber and the outer surface of the first distribution sleeve, and which ends in an annular gap opening, wherein the outer surface of the first distribution sleeve has a single helical distribution groove with more than one winding and less than 1.25 windings.

21 Claims, 4 Drawing Sheets

(51) Int. Cl.
  *B29C 48/30* (2019.01)
  *B29C 48/34* (2019.01)
  *B29K 105/00* (2006.01)
  *B29L 23/00* (2006.01)

(52) U.S. Cl.
  CPC ..... *B29K 2105/258* (2013.01); *B29L 2023/22* (2013.01)

(56) References Cited

U.S. PATENT DOCUMENTS

| | | |
|---|---|---|
| 5,114,333 A | 5/1992 | Hirschberger |
| 5,393,216 A | 2/1995 | Teutsch et al. |
| 6,116,885 A * | 9/2000 | Planeta ................. B29C 48/09 425/467 |
| 6,343,919 B1 | 2/2002 | Rodriguez et al. |
| 6,474,973 B2 | 11/2002 | Beckmann et al. |
| 7,476,094 B2 | 1/2009 | Hanot |
| 2002/0114858 A1 | 8/2002 | Castillo |
| 2003/0020203 A1 | 1/2003 | Davidson et al. |

FOREIGN PATENT DOCUMENTS

| | | |
|---|---|---|
| CN | 1968797 | 5/2007 |
| DE | 19643224 | 8/1998 |
| EP | 0965433 | 12/1999 |
| EP | 2202046 | 6/2010 |
| JP | H01188318 | 7/1989 |
| JP | 2000127219 | 5/2000 |
| JP | 2001225378 | 8/2001 |
| JP | 2010179633 | 8/2010 |
| JP | 2011005824 | 1/2011 |

\* cited by examiner

ANNULAR MANIFOLD FOR AN EXTRUSION HEAD FOR PRODUCING A TUBULAR MOULDING FROM A THERMOPLASTIC MATERIAL

CROSS-REFERENCE TO RELATED APPLICATIONS

This application is a continuation of International Application No. PCT/EP2018/080203, filed on Nov. 5, 2018, which claims priority to and the benefit of EP 17200278.4 filed on Nov. 7, 2017. The disclosures of the above applications are incorporated herein by reference.

FIELD

The present disclosure relates to an annular manifold for an extrusion head for producing a tubular moulding from a thermoplastic material.

BACKGROUND

The statements in this section merely provide background information related to the present disclosure and may not constitute prior art.

An annular manifold for an extrusion head is used for producing a tubular moulding from a thermoplastic material. The annular manifold has an accommodation body with a first accommodation chamber having an inner surface. In the first accommodation chamber a first distribution sleeve is accommodated. The first distribution sleeve has an outer surface with a distribution groove. Furthermore, the annular manifold has an annular first distribution chamber, which is formed between the inner surface of the first accommodation chamber and the outer surface of the first distribution sleeve, and which opens into an annular gap opening.

An extrusion parison head is used to produce a tubular moulding blank or pre-form from a thermoplastic material. Extruded and thus plasticised thermoplastic material mass (molten plastic) is fed from an extruder to the extrusion parison head, in which the compact mass of plastic is formed into a tube (tubular moulding). The produced tubular moulding can, for example, be further processed by extrusion blow moulding in a blow mould to a hollow body.

An annular manifold of the above type is known from EP 2 202 046 A1 which discloses an extrusion head with an accommodation body, in which at least one flow chamber is provided, for forming a hollow strand from the extrudable plastic, as well as for each flow chamber at least two distribution channels, which are connected to different connecting channels, the connecting channels each being connectable to a separate extruder. For each flow chamber, a manifold is provided, which has an outer surface, which represents an inner boundary of the flow chamber, wherein the distribution channels are formed in the shape of recesses in the outer surface. The distribution channels each extend along a part of the circumference of the flow chamber. To provide an even distribution along the whole circumference of the flow chamber, several distribution channels are provided along the whole circumference of the flow chamber. The distribution channels are each worked or formed into the outer surface in the shape of a groove. The distribution channels are each separated into a first distribution branch and a second distribution branch, which branch off from a feed channel in the form of a so called heart curve. In the area, in which the two distribution branches meet, a visible joint may occur in the tubular moulding.

JP 2000 127219 A shows an extrusion head for the production of a tubular film for film blowing machines. The extrusion head has a mandrel with a helical groove in its outer surface.

SUMMARY

This section provides a general summary of the disclosure and is not a comprehensive disclosure of its full scope or all of its features.

An annular manifold for an extrusion parison head which, when used for the production of a tubular moulding made of thermoplastic material, has as little visible joints as possible is provided.

In one form of the present disclosure, the annular manifold for the extrusion parison head for producing the tubular moulding from thermoplastic material has an accommodation body with a first accommodation chamber with an inner surface. In the first accommodation chamber a first distribution sleeve is accommodated. The first distribution sleeve has an outer surface with a distribution groove. Furthermore, the annular manifold has an annular first distribution chamber, which is formed between the inner surface of the first accommodation chamber and the outer surface of the first distribution sleeve, and which opens into an annular gap opening. The outer surface of the first distribution sleeve is provided with a single helical distribution groove with more than one winding and less than 1.25 windings.

The course of the distribution groove can especially correspond to the course of a three dimensional spiral. The course of a three dimensional spiral comprises in the sense of the disclosure a screw-like or helical course, in which the distribution groove is arranged on a cylindrical outer surface. The course of a three dimensional spiral comprises further a course along a conical spiral, in which the distribution groove is worked into a conical outer surface.

The distribution groove of the first distribution sleeve has, thus, in axial direction two overlapping portions, which extend up to a quarter of a winding. Thus, the distribution groove does not overlap along at least three quarters of a winding. The overlapping portions of the distribution groove serve for the fact, that the molten plastic is mixed better in this area along the circumference and that no visible joint or joining edge occurs in the moulding, as this happens in heart shape curve distribution grooves. No mixing takes place over at least three quarters of the circumference, so that the molten plastic is spread as evenly as possible, wherein visible joints are inhibited or prevented by the mixing of the molten plastic in the overlapping portion.

In one form of the present disclosure, it can be provided, that the distribution groove of the first distribution sleeve has a first end, arranged distanced to the annular gap opening and which is fed by a connecting channels for feeding the molten plastic, and a second end, which is arranged close to the annular gap opening. The depth of the distribution groove of the first distribution sleeve can decrease from the first end to the second end. Thus, it is provided, that the pressure in the molten plastic remains at least approximately constant along the length of the distribution groove starting from the first end in direction to the second end. For this purpose, the depth can continuously decrease. In principle, however, a distribution groove with a constant depth or in certain areas with a constant depth is also conceivable.

According to some variations of the present disclosure, the outer surface of the first distribution sleeve is formed frustoconically at least partially along an axial extension of the first manifold sleeve.

In order to provide an at least largely constant thickness of the distribution chamber across the axial extent of the first distribution sleeve or the first distribution chamber, respectively, transversely to the outer surface of the first distribution sleeve, the outer surface of the first distribution sleeve and the inner surface of the first accommodation chamber can run parallel to one another at least in the region of the first distribution chamber.

According to at least one variation of the present disclosure, the outer surface of the first distribution sleeve is in sealing contact to the inner surface of the first accommodation chamber on the side of the distribution groove, facing away from the annular gap opening, and at least in a certain area between the portions of the distribution groove, overlapping in axial direction. Thus, by means of a simple design measure it is provided, that the distribution chamber is sealed in a direction away from the annular gap opening. Thus it is provided, that the molten plastic is expelled only in direction to the annular gap opening.

It can be provided, that the outer surface of the first distribution sleeve is in sealing contact to the inner surface of the first accommodation chamber between the portions of the distribution groove, overlapping in axial direction, starting from the first end of the distribution groove of the first distribution sleeve in direction to the second end along a portion of the overlapping region. Thus, it is provided, that the overlapping portions of the distribution groove are connected by the distribution chamber to each other over a circumferential portion, comprising the second end of the distribution groove. Hence, the molten plastic can flow shortly after the first end out of the distribution groove into the distribution chamber in direction to the end portion of the distribution groove at the second end. Between the first end of the distribution groove in direction towards the overlapping portion of the distribution groove in the area of the second end, however, a sealing contact of the outer surface of the first distribution sleeve against the inner surface of the first accommodation chamber is provided in a certain area. This means that there is no overflow from the distribution groove in the initial area starting from the first end. In the area where the molten plastic is fed into the distribution groove at the first end, no controlled flow conditions may be guaranteed, as the flow is generally perpendicular to the outer surface of the first distribution sleeve, so that markings on the product are avoided by the sealing contact of the outer surface of the first distribution sleeve in this area.

According to some variations of the present disclosure, the annular manifold further comprises a sleeve, which extends through a central bore of the first distribution sleeve, wherein between the sleeve and the first distribution sleeve, an annular flow channel is formed, in which the annular gap opening opens. The flow channel can lead to an annular die, at which the molten plastic exits the extrusion head.

According to at least one variation of the present disclosure, the annular manifold has a second accommodation chamber in the accommodation body, wherein the second accommodation chamber has an inner surface. Furthermore, a second distribution sleeve with an outer surface can be provided, which has a distribution groove, wherein the second distribution sleeve s accommodated in the second accommodation chamber. The annular manifold can form an annular second distribution chamber, which is formed between the inner surface of the second accommodation chamber and the outer surface of the second distribution sleeve, and which opens into the annular gap opening. The outer surface of the second distribution sleeve can have a single helical distribution groove with more than one winding and less than 1.25 windings. The course of the distribution groove of the second distribution sleeve can in particular correspond to the course of a three dimensional spiral, as this was described also in connection with the distribution groove of the first distribution sleeve.

Thus, the annular manifold has two distribution chambers in order to feed two different plastic materials, if desired, or to provide an even better distribution of the molten plastic.

The outer surface of the first distribution sleeve and the outer surface of the second distribution sleeve can each be formed frustoconically at least partially along an axial extension of the annular manifold.

The cone angle of the outer surface of the distribution sleeve and the cone angle of the outer surfaces of the second distribution sleeve can open in opposite directions.

In order to inhibit the ejected tubular moulding from being ejected bent due to mixing of the molten plastic in the overlapping area of the distribution groove, it may be provided that the distribution groove of the first distribution sleeve has a first end remote from the annular gap opening which is fed by a melt guide, and in that the distribution of the second distribution sleeve has a first end remote from the annular gap opening and fed by the melt guide, the first end of the distribution groove of the first distribution sleeve and the first end of the distribution groove of the second distribution sleeve being arranged on diametrically opposite sides relative to a longitudinal axis of the annular manifold.

The design of the outer surface and of the distribution groove of the first distribution sleeve and the design of the outer surface and of the distribution groove of the second distribution sleeve can be identical.

According to another form of the present disclosure, an annular manifold for an extrusion parison head for producing a tubular moulding from a thermoplastic material includes an accommodation body with a first accommodation chamber with an inner surface and a second accommodation chamber with an inner surface. The annular manifold also includes a first distribution sleeve with an outer surface having a distribution groove, wherein the first distribution sleeve is accommodated in the first accommodation chamber, and a second distribution sleeve with an outer surface having a distribution groove, wherein the second distribution sleeve is accommodated in the second accommodation chamber. An annular first distribution chamber which is formed between the inner surface of the first accommodation chamber and the outer surface of the first distribution sleeve, and which opens into an annular gap opening is included, as is an annular second distribution chamber which is formed between the inner surface of the second accommodation chamber and the outer surface of the second distribution sleeve and which opens into the annular gap opening. The outer surface of the first distribution sleeve has a single helical distribution groove with more than one winding and less than 1.25 windings around the first distribution sleeve, and the outer surface of the second distribution sleeve has a single helical distribution groove with more than one winding and less than 1.25 windings around the second distribution sleeve.

In some variations, the distribution groove of the first distribution sleeve and the distribution groove of the second distribution sleeve each have a first end arranged a first distance from the annular gap opening and which are fed by a connecting channel for feeding a molten plastic, and each have a second end arranged a second distance less than the first distance to the annular gap opening. In at least one variation a depth of the distribution groove of the first distribution sleeve decreases from the first end to the second end of the distribution groove of the first distribution sleeve, and a depth of the distribution groove of the second distribution sleeve decreases from the first end to the second end of the of the distribution groove of the second distribution sleeve.

In some variations, the annular manifold has a sleeve which extends through a central bore of the first distribution sleeve and a central bore of the second distribution sleeve such that an annular flow channel is formed between the sleeve and the first distribution sleeve and the sleeve and the second distribution sleeve. In at least one variation, the annular gap opening opens to the annular flow channel.

According to yet another form of the present disclosure, a method for producing a tubular moulding from an extrusion parison head of thermoplastic material includes flowing molten plastic through an annular manifold, the annular manifold comprising an accommodation body with a first accommodation chamber with an inner surface, a first distribution sleeve with an outer surface, which has a distribution groove, wherein the first distribution sleeve is accommodated in the first accommodation chamber, and an annular first distribution chamber, which is formed between the inner surface of the first accommodation chamber and the outer surface of the first distribution sleeve, and which opens into an annular gap opening. In some variations the outer surface of the first distribution sleeve has a single helical distribution groove with more than one winding and less than 1.25 windings around the first distribution sleeve. Also, the molten plastic flows from the distribution groove of the first distribution sleeve into the annular first distribution chamber, the molten plastic flows from the distribution groove of the first distribution sleeve into the annular gap opening, and the molten plastic flows from the annular gap opening into an annular flow channel. In at least one variation, the molten plastic flowing from the distribution groove of the first distribution sleeve into the annular first distribution chamber and the molten plastic flowing from the distribution groove of the first distribution sleeve into the annular gap opening mix before, during and/or after flowing into the annular gap opening such that the tubular moulding is formed without an edge.

In some variations, the annular manifold further comprises a second distribution sleeve with an outer surface having a distribution groove, wherein the second distribution sleeve is accommodated in a second accommodation chamber, and an annular second distribution chamber which is formed between the inner surface of the second accommodation chamber and the outer surface of the second distribution sleeve and which opens into the annular gap opening. In at least one variation, the outer surface of the second distribution sleeve has a single helical distribution groove with more than one winding and less than 1.25 windings around the second distribution sleeve. Also, the molten plastic flows from the distribution groove of the second distribution sleeve into the annular second distribution chamber, the molten plastic flows from the distribution groove of the second distribution sleeve into the annular gap opening, and the molten plastic flows from the annular gap opening into the annular flow channel. In some variations, the molten plastic flowing from the distribution groove of the second distribution sleeve into the annular second distribution chamber and the molten plastic flowing from the distribution groove of the second distribution sleeve into the annular gap opening mix before, during and/or after flowing into the annular gap opening such that the tubular moulding is formed without the edge.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
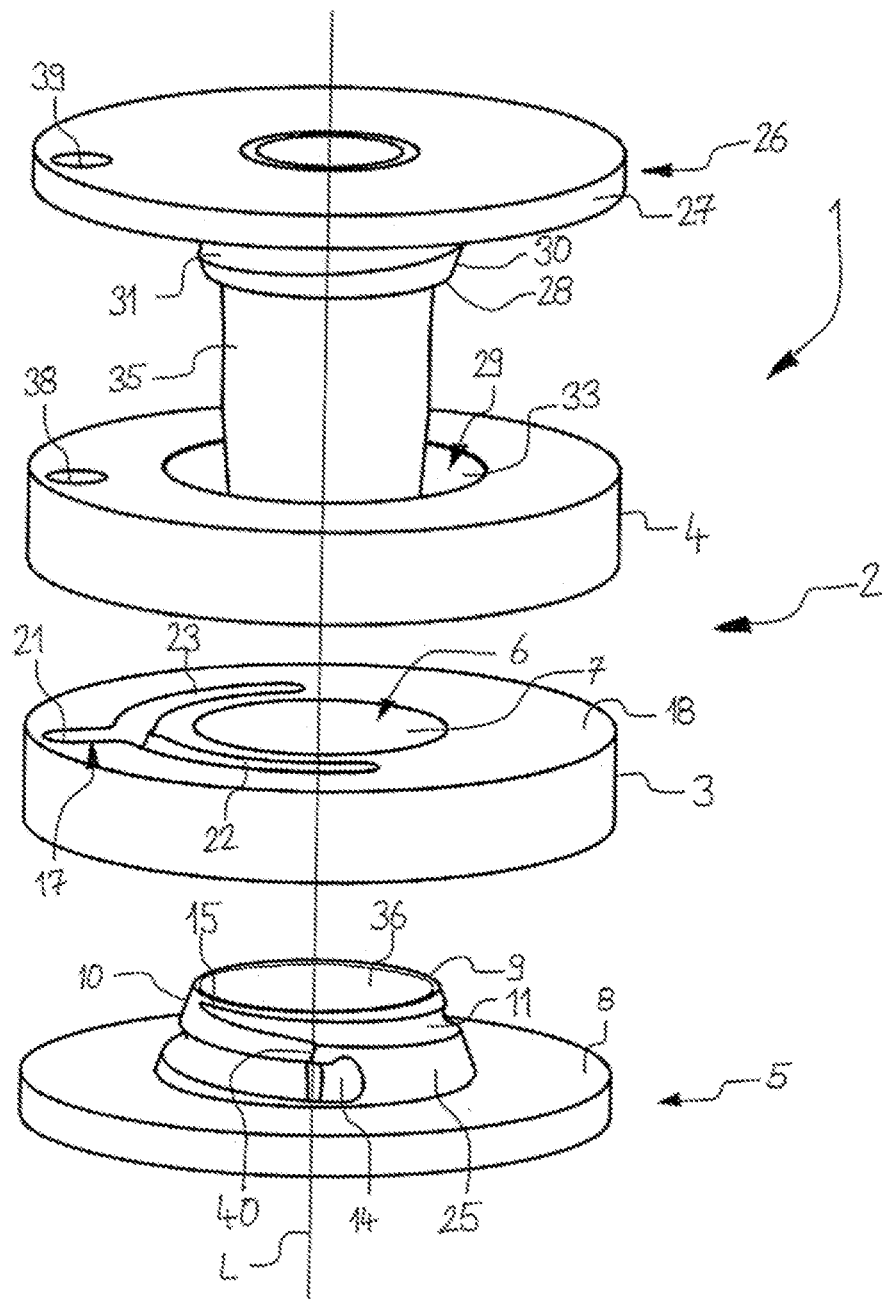
FIG. 1 is a first exploded representation of an annular manifold according to the teachings of the present disclosure.
Figure 2:
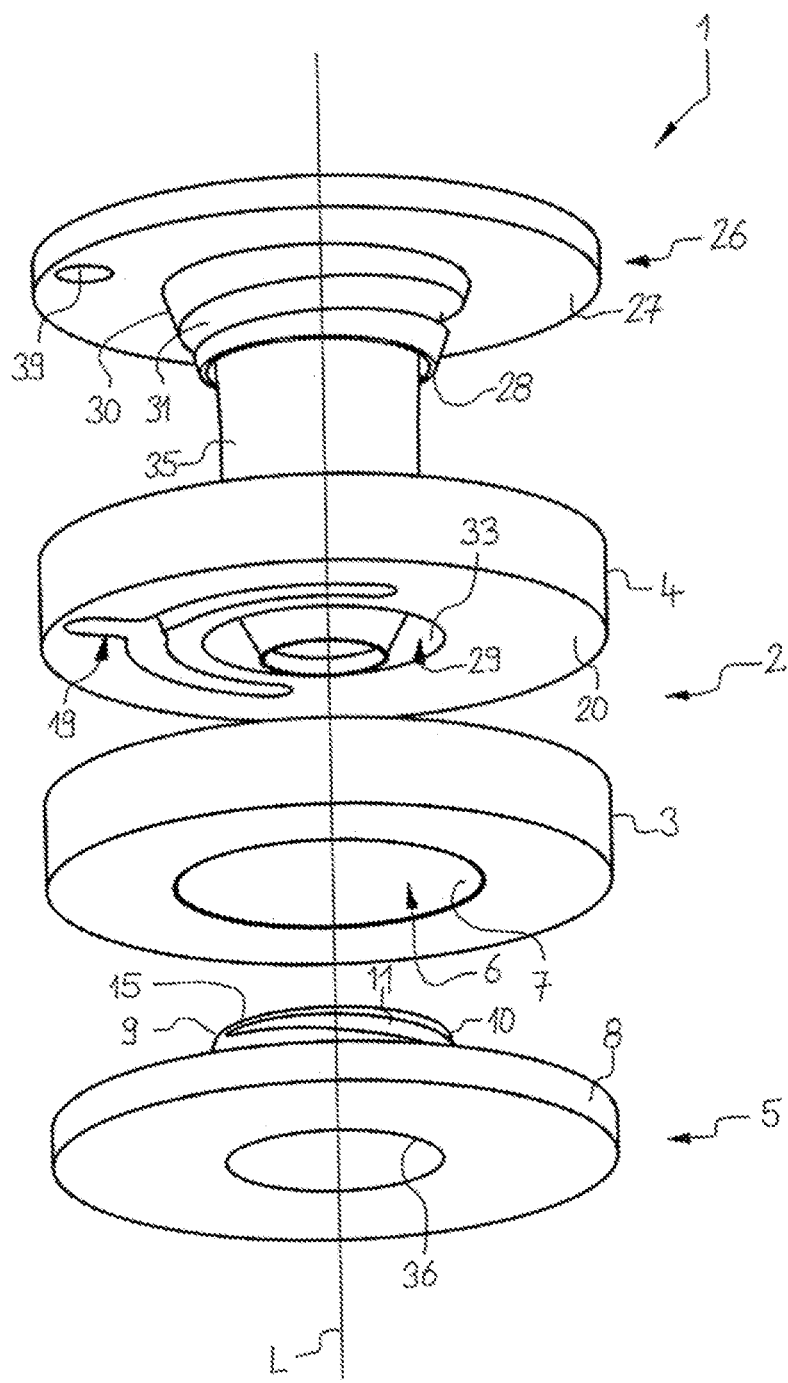
FIG. 2 is a second exploded representation of the annular manifold of FIG. 1.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIGS. 1 to 4 show an annular manifold 1 for an extrusion parison head for producing a tubular moulding from a thermoplastic material. The annular manifold 1 comprises an accommodation body 2, which has a first annular element 3 and a second annular element 4. The two annular elements 3, 4 are arranged coaxially to a longitudinal axis L of the annular manifold 1 and are supported axially against each other.

Furthermore, the annular manifold 1 comprises a first distribution sleeve 5. The first annular element 3 of the accommodation body 2 has a first accommodation chamber 6, which is formed coaxially to the longitudinal axis L as a through opening with an inner surface 7. The accommodation chamber 6 completely extends through the first annular element 3 in the axial direction (i.e., along the direction of the longitudinal axis L).

The first distribution sleeve 5 has a flange portion 8 and a sleeve portion 9. With flange portion 8, the first distribution sleeve 5 is axially supported against the first annular element 3 on one side of the first annular element 3 remote from the second annular element 4. With the sleeve portion 9, the first distribution sleeve 5 is accommodated within the first accommodation chamber 6. The sleeve portion 9 of the first distribution sleeve 5 has an outer surface 10, in which a distribution groove 11 is formed. The distribution groove 11 is formed helical and has more than one winding and less than one and a quarter windings. That is, the distribution groove 11 winds or extends circumferentially around the sleeve portion 9 between one and 1.25 times as illustrated in FIG. 1.

Figure 3:
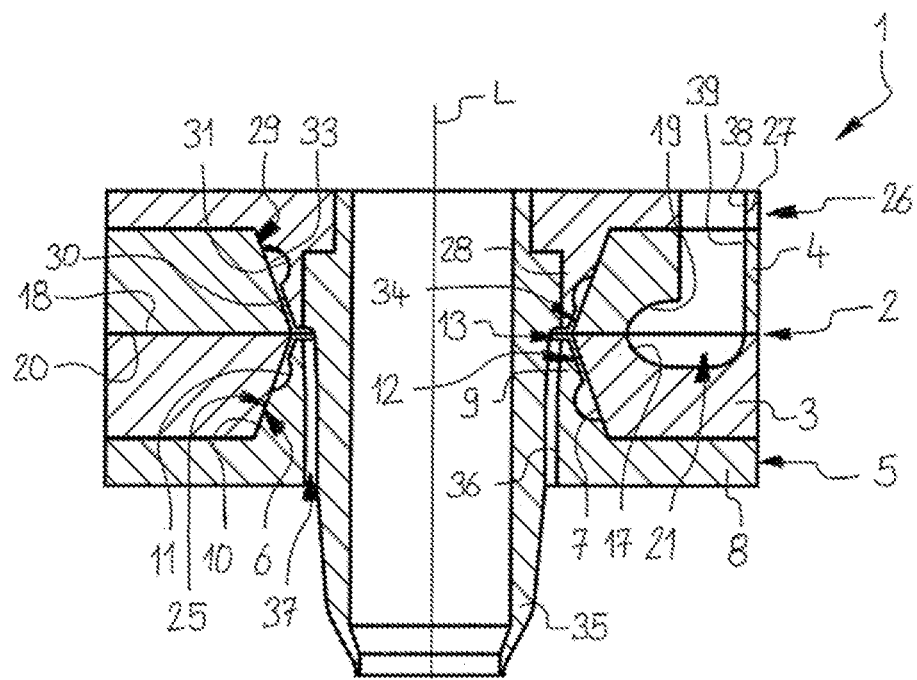
FIG. 3 is a first longitudinal cross-sectional view of the annular manifold of FIG. 1.
Figure 4:
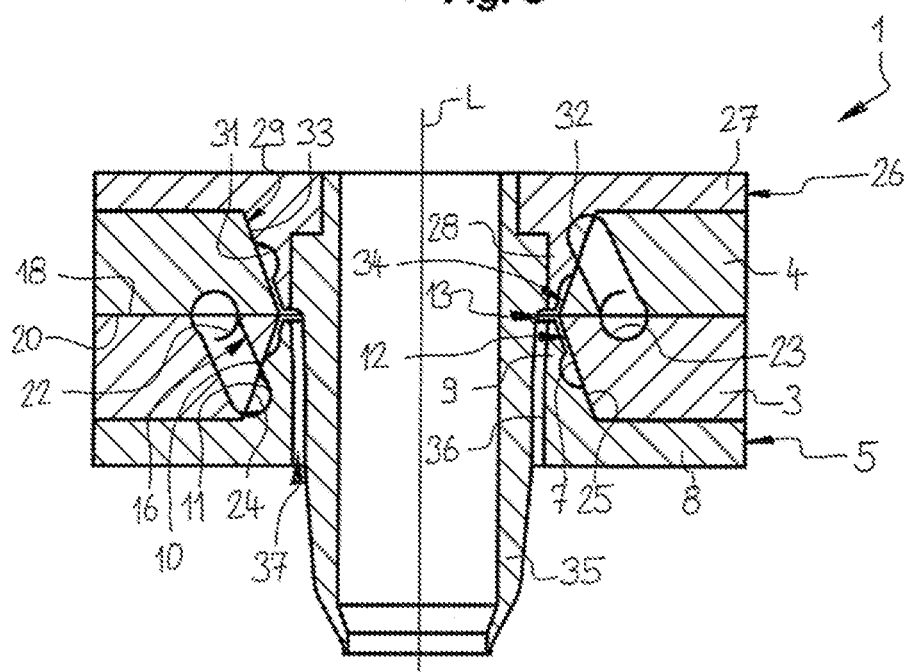
FIG. 4 is a second longitudinal cross-sectional view of the annular manifold of FIG. 1.

Between the inner surface 7 of the first accommodation chamber 6 and the outer surface 10 of the first distribution sleeve 5, a distribution chamber 12 is formed, which opens into an annular gap opening 13 (FIGS. 3 and 4).

The distribution groove 11 of the first distribution sleeve 5 has a first end 14 and a second end 15. The first end 14 (also referred to herein as the inlet end 14) is arranged further away from the annular gap opening 13 than the second end 15 (also referred to herein as the outlet end 15) in the axial direction in relation to the longitudinal axis L. That is, the first end 14 of the distribution groove 11 is arranged a first distance from the annular gap opening 13 and the second end 15 is arranged a second distance less than the first distance from the annular gap opening 13. Furthermore, the inlet end 14 is arranged closer to the flange portion 8 than the outlet end 15.

The inlet end 14 of the distribution groove 11 is fed by a connecting channel 16 (FIG. 4) with molten plastic. In some variations, the connecting channel 16 is formed by a groove 17 (FIGS. 1 and 3) in a surface 18 of the first annular element 3, facing the second annular element 4, and a groove 19 (FIGS. 2 and 3) formed in a surface 20 of the second annular element 4, facing the first annular element. By means of the surfaces 18, 20, the first annular element 3 and the second annular element 4 abut each other, wherein the grooves 17, 19 are arranged opposite to each other, so that the connecting channel 16 is formed. Starting from an inlet 21 (FIG. 1), the connecting channel 16 branches off into a first channel branch 22 and a second channel branch 23. The first channel branch 22 leads to a first connection opening 24 (FIG. 4), which merges in the inner surface 7 of the first accommodation chamber 6 and is aligned with the inlet end 14 of the distribution groove 11 of the first distribution sleeve 5. Thus, the distribution groove 11 of the first distribution sleeve 5 is fed with molten plastic.

Alternatively, the connecting channel 16 can also be arranged in the first distribution sleeve 5, so that the distribution groove 11 is fed from the inside.

Starting from the inlet end 14, the depth of the distribution groove 11 decreases (radially) continuously to the outlet end 15. In this manner, at least approximately constant pressure conditions are provided along the flow direction within the distribution groove 11.

The outer surface 10 of the first distribution sleeve 5 is formed frustoconically, as well as the inner surface 7 of the first accommodation chamber 6. In this case, the outer surface 10 of the first distribution sleeve 5 and the inner surface 7 of the first accommodation chamber 6 are arranged parallel to each other.

In an area of the outer surface 10 of the first distribution sleeve 5, which is facing away from the distribution groove 11 or is arranged between the flange portion 8 and the distribution groove 11, the outer surface 10 of the first distribution sleeve 5 is in sealing contact to the inner surface 7 of the first accommodation chamber 6 thereby forming a sealing portion 25. As used herein, the phrase "sealing contact" refers to two surfaces in contact with each other such that molten plastic does not flow between the two surfaces. Furthermore, the sealing portion 25 extends between the overlapping portions of the distribution groove 11, i.e. between the portions of the distribution groove 11 that overlap along the longitudinal axis L direction. A boundary 40 of the sealing portion 25 is marked in FIG. 1 by an edge. Thus, it is provided, that no molten plastic can exit in the direction towards the flange portion 8 or in the direction away from the annular gap opening 13 out of the distribution groove 11.

In the portion extending between the overlapping portions of the distribution groove 11, the outer surface 10 of the first distribution sleeve 5 and the inner surface 7 of the first accommodation chamber 6 are arranged with a distance between each other, so that this area is part of the first distribution chamber 12.

Thus, the molten plastic is fed at the inlet end 14 into the distribution groove 11, wherein the inlet end 14 is enclosed by the sealing portion 25 of the outer surface 10 of the first distribution sleeve 5. Thus, in the area of the inlet end 14, no molten plastic can exit the distribution groove 11. The molten plastic flows then in the direction of the winding distribution groove 11 to the outlet end 15 of the distribution groove 11. As the molten plastic reaches the first distribution chamber 12, it exits in the axial direction partially from the distribution groove 11. In the overlapping area of the distribution groove 11, thus, the molten plastic flows from the end of the distribution groove 11, arranged close to the flange 8 in the axial direction to the annular gap opening 13 and mixes then with the molten plastic, which flows in the area of the outlet end 15, and flows on, together with a portion of the molten plastic from the area of the distribution groove 11 at the outlet end 15 to the annular gap opening 13. Thus, a good mixing of the molten plastic is achieved and a formed edge is inhibited or prevented. In the residual areas, i.e., the area or length of the distribution groove 11 that does not overlap, the molten plastic flows in axial direction from the distribution groove 11 and forms directly the tubular moulding (product), without the danger of markings in the moulding.

The annular manifold 1 has furthermore a second distribution sleeve 26, which comprises a flange portion 27 and a sleeve portion 28. With the flange portion 27, the second distribution sleeve 26 is axially supported on a side of the second annular element 4, facing away from the first annular element 3, on the second annular element 4. The sleeve portion 28 is accommodated in a second accommodation chamber 29 of the second annular element 4. The second accommodation chamber is formed as a through opening in the second annular element 4, which completely extends through the second annular element 4 in axial direction and forms the inner surface 33.

The sleeve portion 28 of the second distribution sleeve 26 has analogously to the sleeve portion 9 of the first distribution sleeve 5 an outer surface 30, in which a distribution groove 31 is formed. The sleeve portion 28 of the second distribution sleeve 26 is formed identically to the sleeve portion 9 of the first distribution sleeve 5. The outer surface 30 of the second distribution sleeve 26 is formed, thus also frustoconically, wherein the cone angle of the outer surface 30 of the second distribution sleeve 26 opens in opposite direction to the cone angle of the outer surface 10 of the first distribution sleeve 5.

The distribution groove 31 of the second distribution sleeve 26 is fed by the second channel branch 23, which merges in a second connection opening 32 of an inner surface 33 of the second accommodation chamber 29. Between the inner surface 33 of the second accommodation chamber 29 and the outer surface 30 of the second distribution sleeve 26, a second distribution chamber 34 is formed, opening into the annular gap opening 13.

The first connection opening 24 and the second connection opening 32 are arranged on diametrically opposite sides of the longitudinal axis L. Thus, also the overlapping portions of the distribution groove 11 of the first distribution sleeve 5 and the overlapping portions of the distribution groove 31 of the second distribution sleeve 26 are arranged on diametrically opposite sides. Hereby, it is provided, that a constant tubular moulding is formed.

Further, in connection with the second distribution sleeve 26 it is referred to the description concerning the first distribution sleeve 5, since these are functionally identical.

In contrast of the first distribution sleeve 5, the second distribution sleeve 26 has a sleeve 35, which extends on a side of the sleeve portion 28, facing away from the flange portion 27 of the second distribution sleeve 26, from the sleeve portion 28 in axial direction and extends through the first accommodation chamber 6, the second accommodation chamber 29 and a central bore of the first distribution sleeve 5, so that between the sleeve 35 and the first distribution sleeve 5, an annular flow channel 37 is formed, in which the annular gap opening 13 opens.

The second annular element 4 has a through bore 38, which extends parallel to the longitudinal axis L. In the flange portion 27 of the second distribution sleeve 26, a further through bore 39 is provided, which extends also parallel to the longitudinal axis L. The through bore 38 of the second annular element 4 and the through bore 39 of the second distribution sleeve 26 are aligned to each other and are aligned flush to the inlet 21 of the connecting channel 16 and form, thus, a feed channel for feeding the molten plastic.

Figure 5:
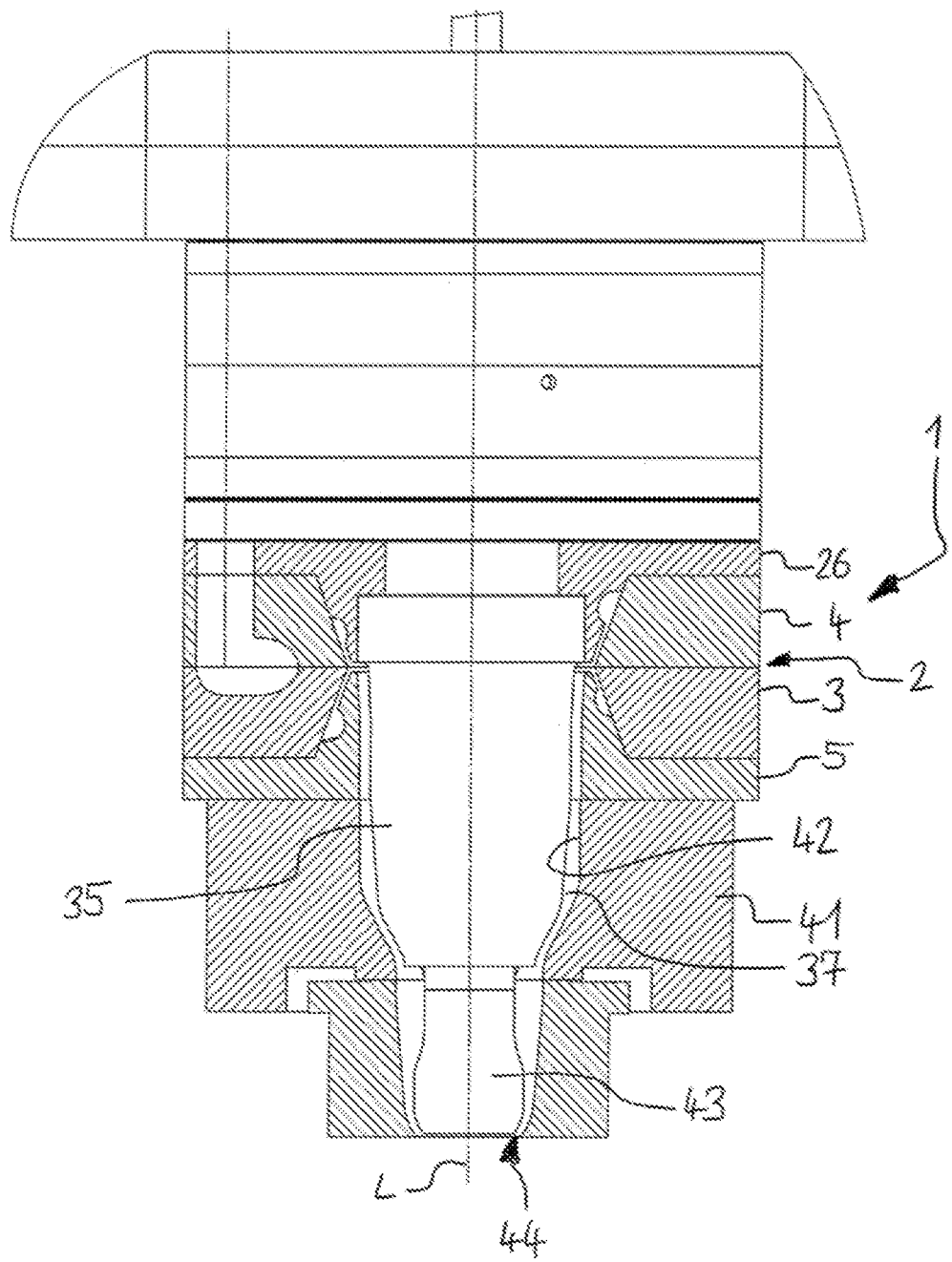
FIG. 5 is a detail of a longitudinal cross-sectional view through an extrusion parison head with an annular manifold of FIG. 1.

FIG. 5 shows schematically an extrusion parison head with an annular manifold 1 according to FIGS. 1 to 4. The annular manifold 1 is connected to a lower housing part 41, in which a central bore 42 is provided. The sleeve 35 of the second distribution sleeve 26 enters the central bore 42 of the lower housing part 41 and forms further the flow channel 37.

Through the sleeve 35, a mandrel 43 projects, which forms together with the lower housing part 41 in a lower end an annular die 44 for the exit of the tubular moulding (product). The mandrel 43 is axially adjustable along the longitudinal axis L, so that the annular die 44 can be closed and the thickness of the gap of the annular die 44 can be adjusted.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a nonexclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An annular manifold for an extrusion parison head for producing a tubular moulding from a thermoplastic material, comprising:
   an accommodation body with a first accommodation chamber with an inner surface,
   a first distribution sleeve with an outer surface, which has a distribution groove, wherein the first distribution sleeve is accommodated in the first accommodation chamber, and
   an annular first distribution chamber, which is formed between the inner surface of the first accommodation chamber and the outer surface of the first distribution sleeve, and which opens into an annular gap opening,
   wherein the outer surface of the first distribution sleeve has a single helical distribution groove with more than one winding and less than 1.25 windings around the first distribution sleeve.

2. The annular manifold according to claim 1, wherein the distribution groove of the first distribution sleeve has a first end arranged a first distance from the annular gap opening and which is fed by a connecting channel for feeding a molten plastic, and a second end arranged a second distance less than the first distance from the annular gap opening, and a depth of the distribution groove of the first distribution sleeve decreases from the first end to the second end.

3. The annular manifold according to claim 1, wherein the outer surface of the first distribution sleeve is formed frustoconically at least partially along an axial extension of the first distribution sleeve.

4. The annular manifold according to claim 1, wherein the outer surface of the first distribution sleeve and the inner surface of the first accommodation chamber extend parallel to each other in an area of the first distribution chamber.

5. The annular manifold according to claim 1, wherein the outer surface of the first distribution sleeve is in sealing contact with the inner surface of the first accommodation chamber on a side of the distribution groove facing away from the annular gap opening and at least partially between regions of the distribution groove overlapping each other in an axial direction.

6. The annular manifold according to claim 5, wherein the outer surface of the first distribution sleeve is in sealing contact with the inner surface of the first accommodation chamber between the regions of the distribution groove overlapping each other in the axial direction starting from a first end of the distribution groove towards a second end of the distribution groove along a part of an overlapping region.

7. The annular manifold according to claim 1, wherein the annular manifold has a sleeve which extends through a central bore of the first distribution sleeve such that an annular flow channel is formed between the sleeve and the first distribution sleeve.

8. The annular manifold according to claim 7, wherein the annular gap opening opens to the annular flow channel.

9. The annular manifold according to claim 1 further comprising:
   a second accommodation chamber in the accommodation body, wherein the second accommodation chamber has an inner surface,
   a second distribution sleeve with an outer surface having a distribution groove, wherein the second distribution sleeve is accommodated in the second accommodation chamber, and
   an annular second distribution chamber which is formed between the inner surface of the second accommodation chamber and the outer surface of the second distribution sleeve and which opens into the annular gap opening,
   wherein the outer surface of the second distribution sleeve has a single helical distribution groove with more than one winding and less than 1.25 windings around the second distribution sleeve.

10. The annular manifold according claim 9, wherein:
    the distribution groove of the first distribution sleeve has a first end arranged a distance from the annular gap opening and which is fed by a connecting channel for feeding a molten plastic, the distribution groove of the second distribution sleeve has a first end arranged a distance to the annular gap opening and which is fed by the connecting channel for feeding the molten plastic, and the first end of the distribution groove of the first distribution sleeve and the first end of the distribution groove of the second distribution sleeve are arranged on diametrically opposite sides relative to a longitudinal axis of the annular manifold.

11. The annular manifold according to claim 9, wherein the outer surface of the first distribution sleeve and the outer surface of the second distribution sleeve are each formed frustoconically at least partially along an axial extension of the annular manifold.

12. The annular manifold according to claim 11, wherein a cone angle of the outer surface of the first distribution sleeve and a cone angle of the outer surface of the second distribution sleeve open in opposite directions.

13. The annular manifold according to claim 1, wherein the first distribution sleeve defines a central bore to allow a mandrel to extend through.

14. An annular manifold for an extrusion parison head for producing a tubular moulding from a thermoplastic material, comprising:
    an accommodation body with a first accommodation chamber with an inner surface and a second accommodation chamber with an inner surface,
    a first distribution sleeve with an outer surface having a distribution groove, wherein the first distribution sleeve is accommodated in the first accommodation chamber,
    a second distribution sleeve with an outer surface having a distribution groove, wherein the second distribution sleeve is accommodated in the second accommodation chamber,
    an annular first distribution chamber which is formed between the inner surface of the first accommodation chamber and the outer surface of the first distribution sleeve, and which opens into an annular gap opening,
    an annular second distribution chamber which is formed between the inner surface of the second accommodation chamber and the outer surface of the second distribution sleeve and which opens into the annular gap opening,
    wherein the outer surface of the first distribution sleeve has a single helical distribution groove with more than one winding and less than 1.25 windings around the first distribution sleeve, and the outer surface of the second distribution sleeve has a single helical distribution groove with more than one winding and less than 1.25 windings around the second distribution sleeve.

15. The annular manifold according to claim 14, wherein the distribution groove of the first distribution sleeve and the distribution groove of the second distribution sleeve each have a first end arranged a first distance from the annular gap opening and which are fed by a connecting channel for feeding a molten plastic, and each have a second end arranged a second distance less than the first distance to the annular gap opening.

16. The annular manifold according to claim 15, wherein a depth of the distribution groove of the first distribution sleeve decreases from the first end to the second end of the distribution groove of the first distribution sleeve, and a depth of the distribution groove of the second distribution sleeve decreases from the first end to the second end of the of the distribution groove of the second distribution sleeve.

17. The annular manifold according to claim 16, wherein the annular manifold has a sleeve which extends through a central bore of the first distribution sleeve and a central bore of the second distribution sleeve such that an annular flow channel is formed between the sleeve and the first distribution sleeve and the sleeve and the second distribution sleeve.

18. The annular manifold according to claim 17, wherein the annular gap opening opens to the annular flow channel.

19. A method for producing a tubular moulding from an extrusion parison head of thermoplastic material, the method comprising:
    flowing molten plastic through an annular manifold, the annular manifold comprising:
        an accommodation body with a first accommodation chamber with an inner surface,
        a first distribution sleeve with an outer surface, which has a distribution groove, wherein the first distribution sleeve is accommodated in the first accommodation chamber, and
        an annular first distribution chamber, which is formed between the inner surface of the first accommodation chamber and the outer surface of the first distribution sleeve, and which opens into an annular gap opening,
    wherein:
        the outer surface of the first distribution sleeve has a single helical distribution groove with more than one winding and less than 1.25 windings around the first distribution sleeve,
        the molten plastic flows from the distribution groove of the first distribution sleeve into the annular first distribution chamber,
        the molten plastic flows from the distribution groove of the first distribution sleeve into the annular gap opening, and
        the molten plastic flows from the annular gap opening into an annular flow channel.

20. The method according to claim 19, wherein the molten plastic flowing from the distribution groove of the first distribution sleeve into the annular first distribution chamber and the molten plastic flowing from the distribution groove of the first distribution sleeve into the annular gap opening mix before, during and/or after flowing into the annular gap opening such that the tubular moulding is formed without an edge.

21. The method according to claim 20, wherein the annular manifold further comprises:
    a second distribution sleeve with an outer surface having a distribution groove, wherein the second distribution sleeve is accommodated in a second accommodation chamber, and
    an annular second distribution chamber which is formed between the inner surface of the second accommodation chamber and the outer surface of the second distribution sleeve and which opens into the annular gap opening,
    wherein:
        the outer surface of the second distribution sleeve has a single helical distribution groove with more than one winding and less than 1.25 windings around the second distribution sleeve,
        the molten plastic flows from the distribution groove of the second distribution sleeve into the annular second distribution chamber,
        the molten plastic flows from the distribution groove of the second distribution sleeve into the annular gap opening,
        the molten plastic flows from the annular gap opening into the annular flow channel, and the molten plastic flowing from the distribution groove of the second distribution sleeve into the annular second distribution chamber and the molten plastic flowing from the distribution groove of the second distribution sleeve into the annular gap opening mix before, during and/or after flowing into the annular gap opening such that the tubular moulding is formed without the edge.

\* \* \* \* \*